(12) United States Patent
Levit et al.

(10) Patent No.: US 9,434,142 B2
(45) Date of Patent: Sep. 6, 2016

(54) METHOD OF MAKING A SANDWICH PANEL

(71) Applicants: Mikhail R Levit, Glen Allen, VA (US); Llewellyn Bentley Richardson, III, Chesterfield, VA (US); Warren Francis Knoff, Richmond, VA (US); Dariusz Wlodzimierz Kawka, Midlothian, VA (US)

(72) Inventors: Mikhail R Levit, Glen Allen, VA (US); Llewellyn Bentley Richardson, III, Chesterfield, VA (US); Warren Francis Knoff, Richmond, VA (US); Dariusz Wlodzimierz Kawka, Midlothian, VA (US)

(73) Assignee: E I DU PONT DE NEMOURS AND COMPANY, Wilmington, DE (US)

(*) Notice: Subject to any disclaimer, the term of this patent is extended or adjusted under 35 U.S.C. 154(b) by 387 days.

(21) Appl. No.: 13/750,234

(22) Filed: Jan. 25, 2013

(65) Prior Publication Data

US 2013/0196175 A1 Aug. 1, 2013

Related U.S. Application Data

(60) Provisional application No. 61/590,909, filed on Jan. 26, 2012.

(51) Int. Cl.
| | |
|---|---|
| *A61F 13/15* | (2006.01) |
| *B29C 65/00* | (2006.01) |
| *B32B 37/00* | (2006.01) |
| *B24D 11/00* | (2006.01) |
| *B32B 3/12* | (2006.01) |
| *B32B 9/00* | (2006.01) |

(Continued)

(52) U.S. Cl.
CPC .............. *B32B 37/02* (2013.01); *B32B 38/00* (2013.01); *B29C 66/474* (2013.01); *B29C 66/71* (2013.01); *B29C 66/7254* (2013.01);

(Continued)

(58) Field of Classification Search
CPC ....... B32B 3/12; B32B 37/146; B32B 37/12; B32B 7/12; B32B 2250/40; B32B 2305/022; B32B 2305/024; E04C 2/365; E04C 2/36; B29D 24/005; B29D 99/089; B29L 2031/608; B29L 2007/002; B29C 65/00; B29C 65/48; B29C 70/025; C09D 7/1291; B29K 2105/167; B82Y 30/00; C08K 2003/04; C08K 2003/045; Y10T 428/24149; Y10T 428/25
USPC ....... 156/60, 72, 77, 78, 276, 278, 279, 290, 156/292, 297; 428/116, 117, 118, 141, 143, 428/195.1, 206, 304.4, 314.4, 315.5, 315.9, 428/323, 357, 402, 411.1, 688
See application file for complete search history.

(56) References Cited

U.S. PATENT DOCUMENTS

| | | | |
|---|---|---|---|
| 6,429,157 B1 * | 8/2002 | Kishi et al. | 442/227 |
| 2008/0286564 A1 * | 11/2008 | Tsotsis | 428/332 |

(Continued)

FOREIGN PATENT DOCUMENTS

| | | |
|---|---|---|
| CN | 101284661 A | 10/2008 |
| CN | 102271905 A | 12/2011 |

(Continued)

OTHER PUBLICATIONS

Corresponding PCT International Search Report for International Application No. PCT/US2013/023393.
"Composites", Engineered Materials Handbook, vol. 1 (1987).
Bitzer, Tom, Materials, Design, Manufacturing, Applications and Testing, Honeycomb Technology, 1977 Chapman & Hall.
Sandwich Panel Fabrication Technology, Hexcel Composites, Jan. 1997.

*Primary Examiner* — William Bell
*Assistant Examiner* — Brian R Slawski

(57) ABSTRACT

A method of making a composite sandwich panel comprises the steps of (i) making a core structure, (ii) making at least one facesheet, (iii) bonding at least one of the at least one facesheets to the core structure, wherein the growth of a carbon nanotube structure is achieved during at least one of steps (i) to (iii).

3 Claims, 3 Drawing Sheets

(51) Int. Cl.
  *B32B 19/00* (2006.01)
  *B32B 37/02* (2006.01)
  *B32B 38/00* (2006.01)
  *B29C 70/02* (2006.01)
  *B32B 37/14* (2006.01)

(52) U.S. Cl.
  CPC .............. *B29C 70/025* (2013.01); *B32B 3/12* (2013.01); *B32B 37/146* (2013.01); *B32B 2250/40* (2013.01); *B32B 2262/106* (2013.01); *B32B 2305/022* (2013.01); *B32B 2305/024* (2013.01); *B32B 2607/00* (2013.01); *Y10T 156/10* (2015.01)

(56) References Cited

U.S. PATENT DOCUMENTS

| | | | |
|---|---|---|---|
| 2010/0003431 A1* | 1/2010 | Raybuck | 428/34.2 |
| 2010/0170746 A1 | 7/2010 | Restuccia et al. | |
| 2012/0064285 A1* | 3/2012 | Mathur | 428/116 |

FOREIGN PATENT DOCUMENTS

| | | |
|---|---|---|
| EP | 2431175 A1 | 3/2012 |
| JP | 2010037660 A | 2/2010 |
| WO | 2011054008 A1 | 5/2011 |

* cited by examiner

METHOD OF MAKING A SANDWICH PANEL

BACKGROUND

1. Field of the Invention

This invention relates to a method of making a composite sandwich panel comprising a carbon nanotube structure.

2. Description of Related Art

Japanese patent application number JP 2010037660 A to Furuzuki discloses that a carbon nanotube (CNT) containing paper can be produced by adding carbon nanotubes in a mono-dispersed state in an amount of 1 to 50 wt. % relative to the total amount of solid materials during a papermaking process. The constituent fiber component of the CNT-containing paper is a natural fiber, a synthetic fiber, an inorganic fiber, a metallic fiber or the like.

Chinese patent application number CN 101284661 A to Wang teaches the preparation of carbon nanotube sheets by adding carbon nanotube material to a solution comprising metallic particles, performing flocculation treatment, adding a reducing agent and separating a nanotube flocculent structure from the solution.

PCT publication WO 2011054008 A to Shah describes a composition including a carbon nanotube (CNT) infused aramid fiber material that includes an aramid fiber material of spoolable dimensions, a barrier coating conformally disposed about the aramid fiber material, and carbon nanotubes (CNT's) infused to the aramid fiber material. The infused CNTs are uniform in length and uniform in density.

Core structures for composite sandwich panels from high modulus high strength fiber nonwoven sheets, mostly in the form of honeycomb, are used in different applications but primarily in the aerospace industry where strength to weight or stiffness to weight ratios have very high values. For example, U.S. Pat. No. 5,137,768 to Lin describes a honeycomb core made from a high-density wet-laid nonwoven comprising 50 wt. % or more of p-aramid fiber with the rest of the composition being a binder and other additives.

Publication WO2011/062980 describes a honeycomb core made from paper comprising 20-85 weight percent of carbon fiber floc. The carbon fibers have a non-round cross sectional aspect ratio of at least 1.5:1. The paper has a fiber volume fraction of at least 35%. The arithmetic mean length of the carbon fibers is at least 0.5 mm. and a length weighted mean length of at least 0.9 mm. Publication WO2011/062980 describes a folded core made from the same paper There is an ongoing need to provide composite sandwich panels having improved mechanical properties such as stiffness, strength, toughness, and impact resistance. This is particularly true for structures used in aircraft, trains, and boats. Such improvements may be achieved by efficient incorporation of a carbon nanotube structure into the sandwich panel.

SUMMARY OF THE INVENTION

This invention pertains to a method of making a composite sandwich panel comprising the steps of
(i) making a core structure,
(ii) making at least one facesheet,
(iii) bonding at least one of the at least one facesheets to the core structure, wherein growth of a carbon nanotube structure is achieved during at least one of steps (i) to (iii).

DETAILED DESCRIPTION OF THE INVENTION

This invention is directed to a method of making a composite sandwich panel comprising the steps of
(i) making a core structure,
(ii) making at least one facesheet,
(iii) bonding at least one of the at least one facesheets to the core structure, wherein the growth of a carbon nanotube structure is achieved during at least one of steps (i) to (iii).

The invention is further directed to a composite sandwich panel made by such a method.

Core Structure

The core structure of this invention is a honeycomb core, a folded core, a foam core, a metallic micro-lattice core, a truss core, a micro-scale truss core or some combination thereof.

Figure 1A:
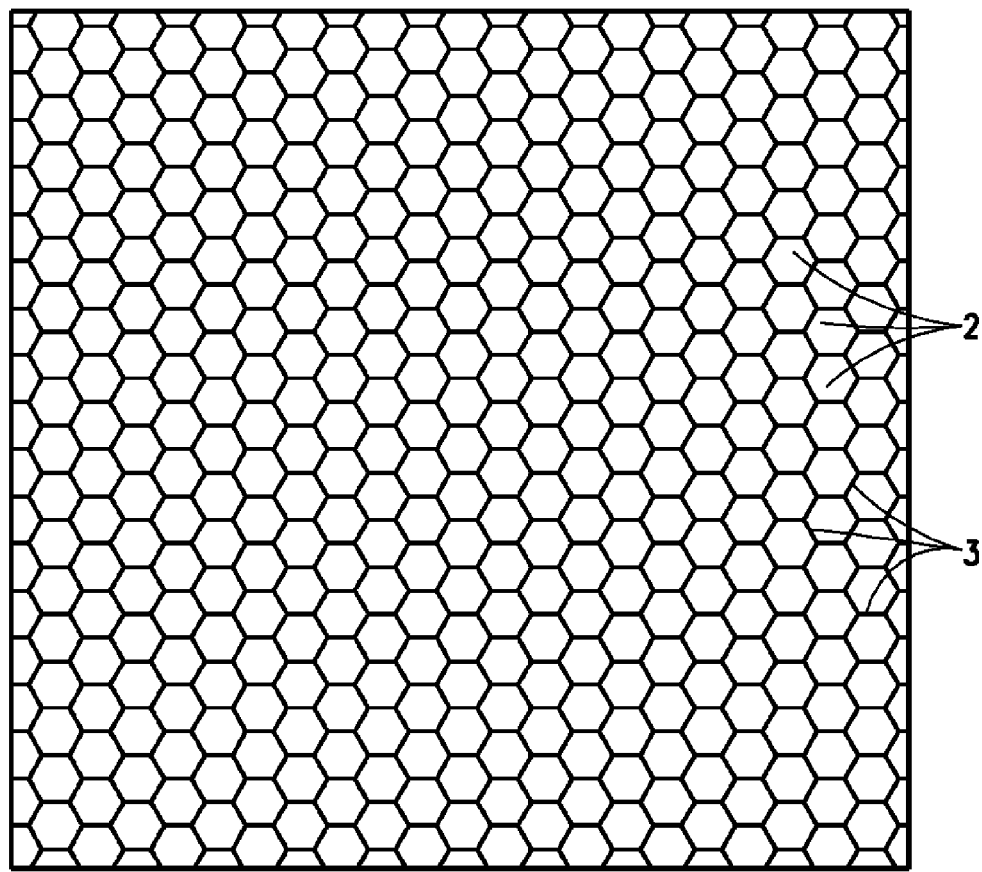
FIGS. 1A and 1B are respectively plan and end views of a hexagonal shaped honeycomb.
Figure 1B:
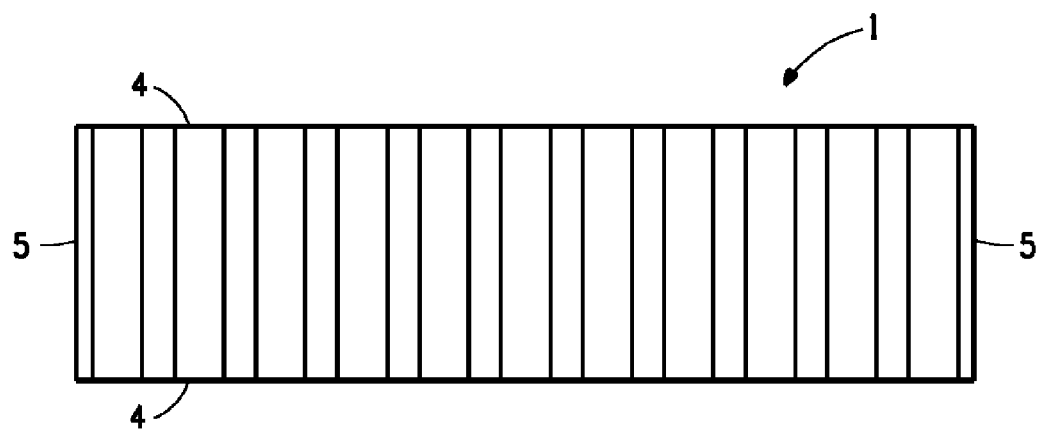
Figure 2:
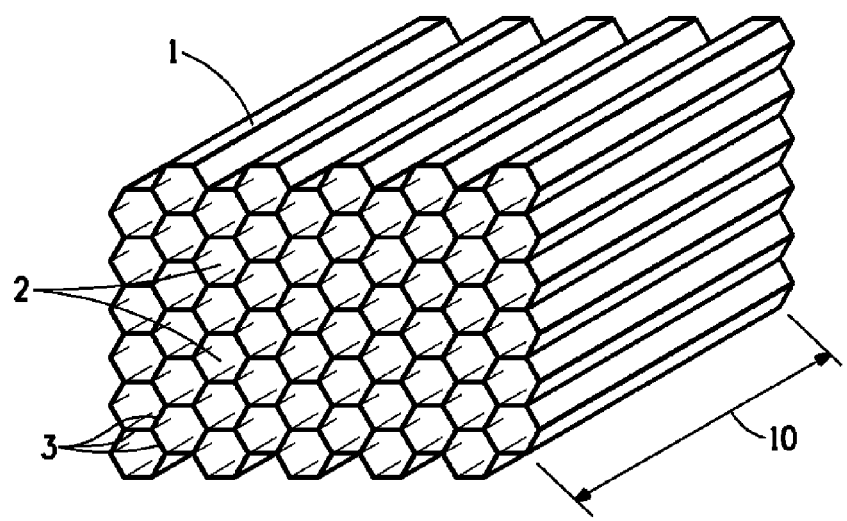
FIG. 2 is a perspective view of a hexagonal cellular honeycomb.

FIG. 1A is a plan view illustration of a honeycomb core 1 and shows cells 2 formed by cell walls 3. FIG. 1B is an end view of the honeycomb shown in FIG. 1A and shows the two exterior surfaces, or faces 4 formed at both ends of the cell walls. The core also has edges 5. FIG. 2 is a perspective view of the honeycomb. Shown is honeycomb 1 having hexagonal cells 2 and cell walls 3. The thickness of the honeycomb is shown at 10 in FIG. 2. Hexagonal cells are shown however other geometric arrangements are possible with square, over-expanded and flex-core cells being among the most common possible arrangements. Such cell types are well known in the art and reference can be made to Honeycomb Technology pages 14 to 20 by T. Bitzer (Chapman & Hall, publishers, 1997) for additional information on possible geometric cell types.

Figure 4:
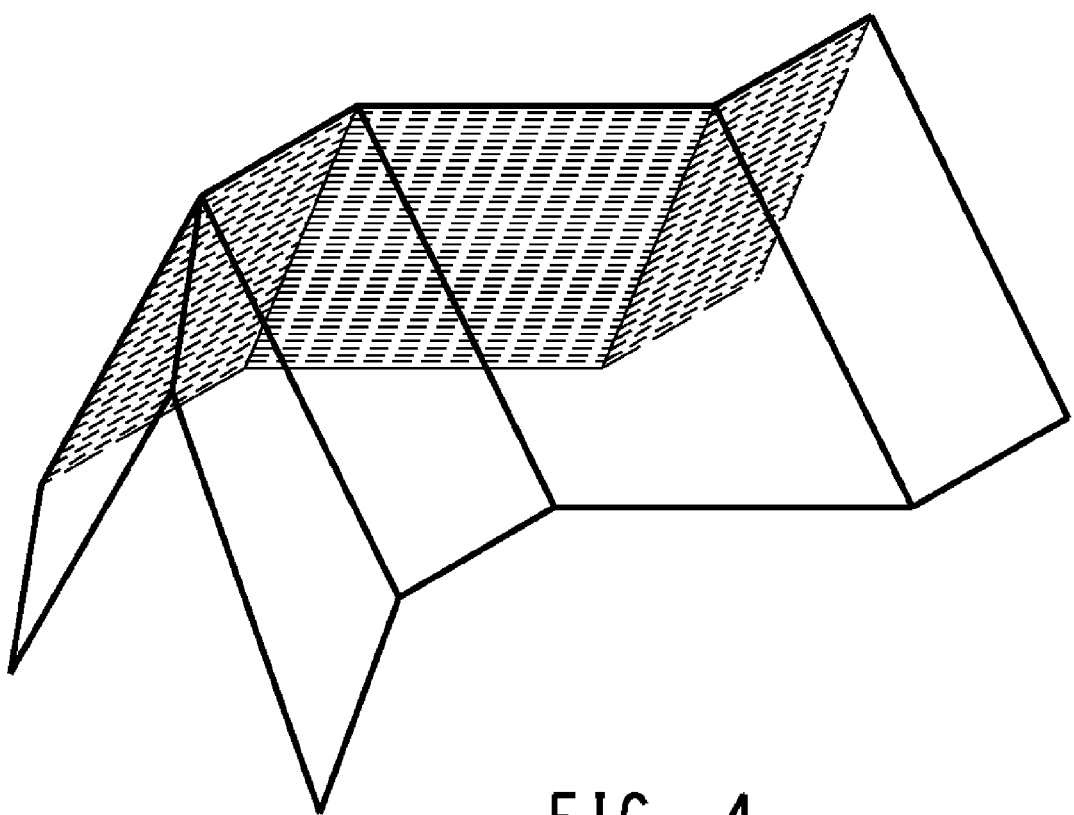
FIG. 4 is a perspective view of a folded core structure.

FIG. 4 shows a folded core structure which is a 3-dimensional structure of folded geometric patterns folded from a relatively thin planar sheet material. Such folded or tessellated sheet structures are discussed in U.S. Pat. Nos. 6,935,997 B2 and 6,800,351 B1. A chevron is a common pattern for three dimensional folded tessellated core structures. Such structures are different from honeycomb structures. A preferred tessellated folded structure is of the type described in U.S. Pat. No. 6,913,570 B2 and United States patent publication number 2010/0048078.

A honeycomb or folded core structure may comprise a film, a fibrous web or a combination of the two. A matrix resin is usually applied to a core made from a fibrous web.

The film can be made from a metal such as aluminum, titanium or steel or from a polymeric material, or their combinations. Examples of polymeric films include polyimide, polysulfonamide (PSA), poly-phenylene sulfide (PPS), liquid crystal polyester, polyetheretherketone (PEEK) and polyertherketoneketone (PEKK). The film may optionally be perforated. For core comprising a perforated film, growth of carbon naotube structures can be initiated in the perforations of the film. Subsequent impregnation with a matrix resin will provide additional reinforcement to the perforated areas.

The fibrous web can be in the form of a nonwoven sheet or a woven, knitted, or unidirectional fabric. In some embodiments, the nonwoven sheet may be in the form of a paper. The paper may also be perforated.

Suitable fibers for the fibrous web include but are not limited to aramid fibers, glass fibers, carbon fibers, silicone carbide fibers, ceramic fibers, boroalumosilicate fibers, metal fibers, aramid fibers, fibers from liquid crystal polyester, fibers from polyetherketone, and fibers from polyetheretherketone. These and other fibers can be utilized in the fibrous web in the form of short or continuous fibers. The short fibers can be in the form of cut fiber (floc), whiskers, or in the form the pulp.

The fibers can be of different diameters, including conventional fibers with diameter in the range of 6-20 micrometers, microfibers with diameter of 1-4 micrometers, and nanofibers with diameters below 1 micrometer.

The fiber cross-section also can be different, including round, ribbon, dog bone and other shapes such as hollow fibers.

The same fibrous web can include fibers of different composition, diameter and cross-sectional shape.

The term "pulp", as used herein, means particles of fibrous material having a stalk and fibrils extending generally therefrom, wherein the stalk is generally columnar and about 10 to 50 micrometers in diameter and the fibrils are fine, hair-like members generally attached to the stalk measuring only a fraction of a micrometer or a few micrometers in diameter and about 10 to 100 micrometers long. One possible illustrative process for making aramid pulp is generally disclosed in U.S. Pat. No. 5,084,136.

A suitable high strength fiber is para-aramid. A commercially available para-aramid high modulus high strength fiber reinforcing paper web for the production of core structures is KEVLAR® N636 paper sold by E. I. DuPont de Nemours and Company, Wilmington, Del. Core structures can also me made from m-aramid fiber nonwoven web also available from DuPont under the tradename NOMEX®.

Suitable glass fibers include S-glass and E-glass. E-Glass is a commercially available low alkali glass. One typical composition consists of 54 weight % $SiO_2$, 14 weight % $Al_2O_3$, 22 weight % CaO/MgO, 10 weight % $B_2O_3$ and less then 2 weight % $Na_2O/K_2O$. Some other materials may also be present at impurity levels. S-Glass is a commercially available magnesia-alumina-silicate glass. This composition is stiffer, stronger, more expensive than E-glass and is commonly used in polymer matrix composites.

Carbon fibers based on polyacrylonitrile are commercially available in standard, intermediate or high modulus grades such as Torayca® from Toray Carbon fibers America, Decatur, Ala. or HexTow® from Hexcel Corporation, Stamford, Conn. Carbon fibers may also be pitch based such as Thornel® from Cytec Carbon Fibers LLC, Piedmont, S.C.

If the fibrous reinforcing web for the core is in the form of a paper, some additional binder in the paper structure is required to provide necessary strength and processibility of the web into the core structure.

A preferable binder in the paper is fibrids. The term "fibrids" as used herein, means a very finely-divided polymer product of small, filmy, essentially two-dimensional particles having a length and width on the order of 100 to 1000 micrometers and a thickness on the order of 0.1 to 1 micrometer. Fibrids are typically made by streaming a polymer solution into a coagulating bath of liquid that is immiscible with the solvent of the solution. The stream of polymer solution is subjected to strenuous shearing forces and turbulence as the polymer is coagulated. Preparation of fibrids is taught in U.S. Pat. No. 3,756,908 with a general discussion of processes to be found in U.S. Pat. No. 2,999,788. The fibrids should be refined in accordance with the teachings of U.S. Pat. No. 3,756,908 patent only to the extent useful to permit permanent densification and saturability of the final paper.

Preferable polymers for fibrids in this invention include aramids (poly (m-phenylene isophthalamide) and poly (p-phenylene terephthalamide)). Other binders include polysulfonamide (PSA), polyphenylene sulfide (PPS), and polyimides. Other binder materials are in the general form of resins and can be epoxy resins, phenolic resins, polyureas, polyurethanes, melamine formaldehyde resins, polyesters, polyvinyl acetates, polyacrylonitriles, alkyd resins, and the like. Preferred resins are water dispersible and thermosetting. Most preferred resin binders comprise water-dispersible epoxy resins.

When the reinforcing web is fabricated into a honeycomb core structure there are two principal methods of manufacture, expansion or corrugation. Both methods are well known in the art and are further detailed on page 721 of the Engineered Materials Handbook, Volume 1—Composites, ASM International, 1988. In addition to the standard technique of bonding sheets together along node lines using an adhesive, other methods such as melt bonding, ultrasonic bonding, and laser bonding can be applied.

In some embodiments, prior to the expansion or corrugation processes, the web may be coated with a first amount of coating resin with the remainder being applied in a second amount after honeycomb formation.

When the reinforcing web is fabricated into a folded core structure, different production techniques are required. Processes for converting web substrates into folded core structures are described in U.S. Pat. Nos. 6,913,570 B2 and 7,115,089 B2 as well as US patent application 2007/0141376. In some embodiments, all of the coating resin is applied after folded core formation while in other embodiments the web substrate is coated with a first amount of coating resin prior to forming of the core with the remainder being applied in a second amount after core formation.

Methods for coating the webs before and after core formation are well known in the art.

The thickness of the reinforcement web before application of the matrix resin is dependent upon the end use or desired properties of the honeycomb core and in some embodiments is typically from 25 to 100 micrometers (1 to 4 mils) thick. In some embodiments, the basis weight of the web is from 10 to 50 grams per square meter (0.3 to 1.5 ounces per square yard).

Foam core can be made from organic polymers. Polymeric foam cores have a porous cellular structure. The cells may be open and interconnected or closed and discrete. Both thermoset and thermoplastic resins may be used to make a foam core. Almost any polymer can be made into a foam core by adding an appropriate blowing or foaming agent. Examples of polymeric foam cores are polystyrene, polyurethane, polyvinylchloride, polyimide, polyetherimide and polymethacrylimide. Foam core can also be made from ceramic materials or from metals and their alloys. A foam core may be reinforced with fibrous or partculate filler. Examples of particulate fillers include mica, vermiculite, and clay nanoparticles. Preferably the foam core of this invention is a closed-cell core. The growth of carbon nanotube structures on the surface of a closed cell foam core or not far below the surface of the core can deliver improvement of the bond with the facesheet, as well as providing special electrical properties or some other unique attributes to the structure. For other applications, open cell foam can also be suitable and the growth of carbon nanotube structures can be achieved throughout the core.

A metallic microlattice is a synthetic porous metallic material based on an interpenetrating array of micro-scale periodic hollow-tubes. These materials are fabricated by starting with a template formed by self-propagating photopolymer waveguide prototyping, coating the template by electroless metal plating, with nickel being one of the suitable metals and subsequently etching away the template. The polymer template is first prepared using a technique based on self-propagating waveguide formation. Other methods can also be used to fabricate the template. The process passes UV light through a perforated mask into a reservoir of UV-curable resin. Fiber-optic-like "self-trapping" of the light occurs as the resin cures under each hole in the mask, forming a thin polymer fiber along the path of the light. By using multiple light beams, multiple fibers can then interconnect to form a lattice. The process is similar to photolithography in that it uses a 2D mask to define the starting template structure, but differs in the rate of formation: where stereolithography might take hours to make a full structure, the self-forming waveguide process enables templates to be formed in 10-100 seconds. In this way, the process enables large free-standing 3D lattice materials to be formed quickly and scalably. The template is then coated with a thin layer of metal by electroless nickel plating, and the template is etched away, leaving a free-standing, periodic porous metallic structure. A process to produce a metallic microlattice is described by Schaedler, T. A. et al in "Ultralight Metallic Microlattices". Science 334 (6058): 962. A micro-scale lattice structure may also be made from a polymeric material instead of metal.

A micro-scale truss is an open-cellular polymer microtruss structures. Examples of suitable polymers include, but are not limited to, polyimide, polysulfonamide (PSA), polyphenylene sulfide (PPS), liquid crystal polyester, polyetheretherketone (PEEK), and polyetherketoneketone (PEKK). In one embodiment micro-scale truss structure is formed from an interpenetrating array of self-propagating polymer waveguides. One processes to produce micro-scale polymeric truss structures is described by Jacobsen, A. J and coworkers in "Micro-scale Truss Structures formed from Self-Propagating Photopolymer Waveguides". Advanced Materials 19 (22): 3892-3896.

Examples of other types of truss structures are described in U.S. Pat. Nos. 6,291,049 B1 and 5,741,574.

Facesheet

Figure 3:
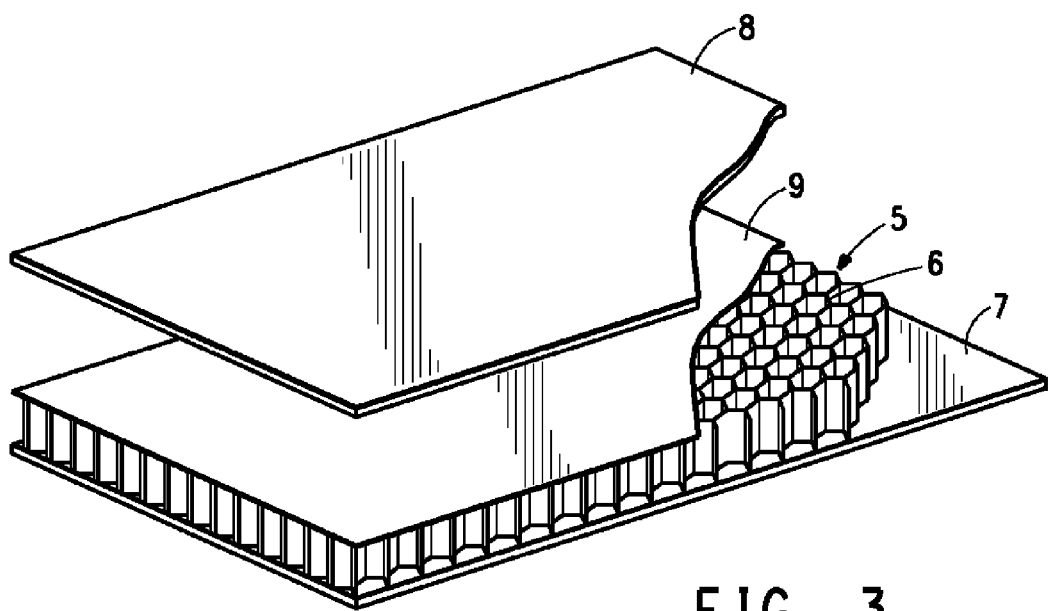
FIG. 3 is a perspective view of a sandwich structure comprising a honeycomb core and facesheets.

FIG. 3 shows a structural composite sandwich panel 5 assembled from a honeycomb core 6 with facesheets 7 and 8, attached to the two exterior surfaces of the core. The preferred facesheet material is a prepreg, a fibrous sheet impregnated with thermoset or thermoplastic resin, although metallic or plastic face sheets may also be utilized. With metallic face sheets, and in some circumstances with prepreg and plastic facesheets, an adhesive film 9 is also used. Normally there are at least two prepreg facesheets on either side of the core.

The reinforcing fiber of the prepreg is typically carbon, glass, aramid or a combination of these fibers. The reinforcing fibers may be provided in the form of a woven fabric, a nonwoven fabric or a unidirectional fabric.

Resin

The reinforcing web in the core and the facesheet is impregnated or coated with a matrix resin. In some embodiments, the resin either fully or partially impregnates into the web or facesheet. The coating resin comprises from 15 to 75 weight percent of the weight of web plus resin. The matrix resin may be a thermoset or thermoplastic resin. Suitable resins include phenolic, epoxy, flame retarded epoxy, polyester, polyamide, polyimide, polyphenylenesulfide (PPS), Polyetheretherketone (PEEK), polyertherketoneketone (PEKK), polyether sulfone (PES) and blends thereof. The matrix resin may contain additional performance enhancing or modifying ingredients to improve properties of the structural core or sandwich panel of this invention. Such ingredients include clay nanoparticles, carbon nanotubes, mica powder and the like.

When the complete or initial resin impregnation of the web is conducted prior to core or facesheet forming it is preferred that the resin is partially cured. Such a partial curing process, known as B-staging, is well known in the composite materials industry. By B-stage we mean an intermediate stage in the polymerization reaction in which the resin softens with heat and is plastic and fusible but does not entirely dissolve or fuse. The B-staged reinforcing web is still capable of further processing into the desired core shape.

When the resin impregnation is conducted after the core has been formed, it is normally done in a sequence of repeating steps of dipping followed by solvent removal and curing of the resin. The preferred final core densities (nonwoven sheet plus resin) are in the range of 20 to 150 kg/m$^3$. During the resin impregnation process, resin is coated onto and absorbed into and the reinforcing web.

The resins may be used as solutions or dispersions in solvents or dispersion media, for example water, acetone, propan-2-ol, butanone, ethyl acetate, ethanol, and toluene. Mixtures of these solvents may be used to achieve acceptable evaporation rates of the solvent from the core. The amount of solvent used will vary widely depending upon a number of factors including the type of core material being used. In general, the solvents should be added in amounts to provide a resin solution which may be easily applied in accordance with known processes.

Thermoplastic resins can be used in the melt phase or can be applied as a film under the action of heat and pressure. Tcore or facesheet as a fiber, fibrid, pulp, or powder followed by application of heat and pressure for better penetration of the resin and formation of a continuous matrix.

Some resins, for example benzoxazine resin, can be applied as a hot melt adhesive followed by curing at an appropriate temperature.

Bonding of the Facesheet to the Core in Making a Composite Panel

Core structures may be used to make structural composite panels having facesheets bonded to at least one exterior surface of the core structure. The facesheets are attached to the core structure under pressure and usually with heat by an adhesive film or from the resin in the prepreg of the facesheet. The curing is carried out in a press, an oven or an autoclave.

Other techniques can be also applied for bonding of the facesheet to the core. Such techniques include, but are not limited to, laser bonding, ultrasound bonding, and welding.

The steps of making a composite sandwich panel of this invention are (i) make a core structure, (ii) make at least one facesheet and (iii) bond at least one of the at least one facesheets to the core structure such that the growth of carbon nanotube structures is achieved during at least one of steps (i) to (iii).

Growth of a Carbon Nanotube Structure

By carbon nanotube structure is meant a structure obtained from grown carbon nanotubes resulting from vapor deposition or other suitable process for growing of carbon nanotubes on a surface of or inside of a CNT support material. Such a CNT structure, in general terms, can include single and multiwall carbon nanotubes of different lengths, with and without branches and cross-links.

The carbon nanotube structure can be grown on the surface of or inside of at least one component of a composite sandwich panel such as a core or a facesheet. In some embodiments, the structure is grown on both the core and at least one facesheet. The growth can be initiated at different stages of the composite sandwich panel preparation. The growth of the carbon nanotube structure can occur during the making of the core structure. Alternatively, the growth of the carbon nanotube structure can occur on the core structure after the core structure has been bonded to the at least one facesheet. In some embodiments, the growth of the carbon nanotube structure can occur on the facesheet during the making the facesheet or even on the facesheet after the facesheet has been bonded to the core structure. The desired stage of such growth initiation depends on factors such as the final design of the composite sandwich panel, the thermal stability of components of the panel at each stage during manufacture or on economic and other reasons.

If the growth of carbon nanotube structure is conducted after the at least one facesheet has been bonded to the core, an outer surface of the facesheet is completely available for such growth. The growth of carbon nanotube structures on the core or internal surface of the facesheet after bonding of the facesheet to the core is generally limited to special cases of perforated core and/or perforated facesheets or to examples of very thin cell walls. In this latter case, the reaction gas can penetrate through the cell walls within a reasonable time period.

Core structures are normally made from a web. Preferably the web is fibrous or film-like. CNT growth can occur on the fiber before the fiber is subsequently made into a web, or on the web at a convenient stage during its conversion into a core. For core made by an expansion process, the CNT growth can take place after expansion but before resin coating of the expanded core or after expansion and resin coating. For core made by a corrugation process, the CNT growth can take place before corrugation, after corrugation but before final resin coating of the corrugated core or after corrugation and final resin coating. For folded core, the CNT growth can take place before folding or after folding corrugation but before final resin coating of the folded core or after folding and final resin coating. Growth of CNT's may also take place on the core after the at least one facesheet has been bonded to the core.

In the case of a metallic microlattice foam, growth of a carbon nanotube structure would be initiated on the final metallic microlattice matrix.

In the case of a micro-scale polymeric truss material, growth of the carbon nanotube structure would be initiated on the final micro-scale polymeric truss material. After CNT growth has finished the actual polymeric truss structure could be either etched away leaving only a CNT truss structure or be retained as part of a final truss core.

Requirements for the growth of a carbon nanotube structure are a catalyst, a source of carbon, plus a suitable temperature range Suitable types of the catalyst are described, for example, in U.S. Pat. No. 7,611,579 and include nickel, iron, cobalt or a combination thereof.

The catalyst, or some intermediate substance capable of further conversion into a catalyst, can be placed directly into or onto the core, core substrate or facesheet or applied on the surface of the structure through water or solvent media.

Such intermediate catalytic substances usually include metal salts and metal oxides and the corresponding chemical or thermal reactions are conducted to convert them into the final catalyst form. Preferably the catalyst is a nanoparticle. If the size of catalyst particles are 2 nm or below, the majority of the CNT's grown are single wall carbon nanotube structures. For catalyst particles greater in size than 2 nm but less than about 100 nm most of the growth is of multiwall carbon nanotube structures. Sources of carbon for the growth of carbon nanofibers and nanotubes include ethanol, methane, methanol, acetylene, ethylene, xylene, carbon monoxide and like. Preferred reaction gases for the growth of carbon nanotube structures are hydrogen, inert gas such as helium or argon or a gas that is a source of carbon. An evacuation gas such as hydrogen blended with inerts gas is normally applied to remove by-products of the reaction.

The preferred temperature for CNT growth is in the range of from about 400 degrees C. to about 1400 degrees C. Factors influencing the chosen temperature and reaction time include catalyst type, catalyst amount, thermal stability of the material on which the CNT's are to be grown and the required amount of carbon nanotube structure. In general, polymeric materials and specifically those of an organic nature, require lower temperatures to minimize their thermal degradation. Metals and other inorganic materials can withstand much higher temperatures.

The quantity of carbon nanotube structure grown on the core substrate, core or facesheet can vary from fractions of a percent to 40-50 percent of the weight of the material on which the CNT's are grown. If the main goal is to enhance adhesion between elements of the structure, increase the resistance of the structure to crack propagation, or provide special electrical properties to the structure (conductivity, electromagnetic shielding) a small quantity of carbon nanotube structure can be adequate. If the main goal is to increase stiffness, strength or other mechanical properties of the structure by utilizing characteristics of a resin impregnated carbon nanotube structure, then the amount of CNT deposited should be much higher. Accordingly, the time required for the growth of carbon nanotube structure can vary from less than a few minutes to hours.

The growth of carbon nanotube structures during the process of making sandwich panel has significant advantages in comparison with known methods of the introduction of carbon nanotubes in such structures. One advantage can be demonstrated for the case of a core made from a fibrous web based on glass, carbon, ceramic, or other brittle material. Such a web cannot be densified for optimum density in order to have high fiber and low matrix resin content in the walls of the final core and thus provide maximum specific stiffness and strength of the corresponding structure. Brittle fibers cannot survive a high pressure calendering process. However, in the case of growing a carbon nanotube structure on the web, a significant increase in density of the final fibrous web material can be achieved without application of high pressure calendering and, as a result, much higher specific properties of the core and the sandwich panel are obtained.

What is claimed is:

1. A method of making a composite sandwich panel comprising the steps of
    (i) making a honeycomb core structure comprising cell walls,
    (ii) making at least one facesheet, and
    (iii) bonding at least one of the at least one facesheets to the core structure, wherein growth of a carbon nanotube structure is achieved on a surface of or inside the honeycomb core cell walls during step (i) or step (iii) or after the core structure has been bonded to the at least one facesheet.

2. The method of claim 1 wherein the core structure comprises a nonwoven sheet, a woven fabric or a unidirectional fabric.

3. The method of claim 2 wherein the nonwoven sheet is a paper.

* * * * *